United States Patent [19]

Stenzel et al.

[11] Patent Number: 5,798,929

[45] Date of Patent: Aug. 25, 1998

[54] APPARATUS AND METHOD FOR PROCESSING THIN SHEET MATERIAL SUCH AS BANK NOTES

[75] Inventors: Gerhard Stenzel, Germering; Bodo Albert, München; Klaus Buchmann, München; Alfred Schmidt, München, all of Germany

[73] Assignee: Giesecke & Devrient GmbH, Munich, Germany

[21] Appl. No.: 588,028

[22] Filed: Jan. 17, 1996

[30] Foreign Application Priority Data

Jan. 17, 1995 [DE] Germany ............... 195 01 244.5

[51] Int. Cl.⁶ .......................................... G06F 19/00
[52] U.S. Cl. ............................ 364/478.01; 364/187
[58] Field of Search ............... 364/478.07, 478.01, 364/478.11, 478.12, 478.08, 478.09, 478.1, 184–187; 395/235, 242, 243, 244, 245, 609, 610, 488, 489, 182.04, 182.09, 186, 187.01, 188; 902/1, 30, 31; 235/379; 209/534; 705/35, 42–45; 707/204

[56] References Cited

U.S. PATENT DOCUMENTS

| | | | |
|---|---|---|---|
| 4,466,098 | 8/1984 | Southard | 395/182.1 |
| 4,539,702 | 9/1985 | Oka | 380/4 |
| 5,101,373 | 3/1992 | Tanioka et al. | 395/186 |
| 5,155,845 | 10/1992 | Beal et al. | 395/182.04 |
| 5,283,828 | 2/1994 | Saunders et al. | 209/534 X |
| 5,307,481 | 4/1994 | Shimazaki et al. | 395/182.09 |
| 5,404,508 | 4/1995 | Konrad et al. | 395/182.04 X |
| 5,544,347 | 8/1996 | Yanai et al. | 395/182.04 X |

FOREIGN PATENT DOCUMENTS

| | | |
|---|---|---|
| C-2760453 | 1/1979 | Germany . |
| A-3347607 | 7/1984 | Germany . |
| A-4034444 | 5/1992 | Germany . |
| A-4443587 | 8/1995 | Germany . |

*Primary Examiner*—Joseph Ruggiero
*Attorney, Agent, or Firm*—Hazel & Thomas

[57] ABSTRACT

A module-based apparatus for automatically processing thin sheet material is provided. The individual modules perform the tasks necessary for processing the sheet material. They are connected with one another and with a control device in such a way that data can be transmitted between all components. Additionally a safety device is provided for monitoring the data exchange among the modules themselves and between them and the control device. The safety device is in a position to prepare logs of the processing operations and to recognize manipulation of the apparatus with intent to defraud.

15 Claims, 1 Drawing Sheet

APPARATUS AND METHOD FOR PROCESSING THIN SHEET MATERIAL SUCH AS BANK NOTES

FIELD OF INVENTION

This invention relates to an apparatus for automatically processing thin sheet material such as bank notes.

BACKGROUND OF THE INVENTION

The apparatus is constructed of individual modules which perform different tasks in processing the bank notes. These tasks can consist of e.g. singling bank notes from a stack, testing the state or authenticity of bank notes, controlling the transport of bank notes, stacking or destroying bank notes. Furthermore the apparatus has a control device for controlling the individual processing operations. The individual visual modules and control device are interconnected in such a way that data can be transmitted between them. The data contains the information necessary for operating the apparatus, for example control commands, programs, result data or reference data.

DE-PS 27 60 453 discloses such a processing apparatus. For data exchange between the control device and the modules a main memory is used which both the modules and the control devices can access. In the main memory the particular data required by the individual components are filed. In addition the modules are directly interconnected for data exchange.

DE-OS 33 47 607 shows a processing apparatus wherein a plurality of similar modules are used for optically testing the sheet material. The individual modules are connected with one another as well as with the control device by a data bus. Connected to the data bus is a higher-order memory which both the control device and the individual modules can access.

In an apparatus of the stated type, disturbances during operation can generally lead to errors in counting the bank notes or in properly associating the bank notes with corresponding counter readings in the modules. Disturbances which may occur here are for example mechanical disturbances such as bank note jams, electric disturbances, disturbances in data processing or disturbances due to misoperation of the apparatus. The consequence of these disturbances is that no full counting reliability can be guaranteed for the bank notes.

Known apparatuses have no measures for protecting against data manipulation done with the intent to defraud. Such manipulation can consist e.g. in changing the programs for logging processing operations or changing the stored data records. Manipulation of this type makes it possible to enrich oneself by removing bank notes from the processing apparatus and simultaneously preparing a processing log which suppresses the removal.

OBJECTS OF THE INVENTION

The invention is therefore based on the problem of providing a processing apparatus which both increases the counting reliability in case of disturbances, and guarantees protection against manipulation with intent to defraud.

SUMMARY OF THE INVENTION

The basic idea of the invention is substantially to provide in addition to the control device at least one safety device connected with the connection for data exchange (e.g. data bus) among the modules themselves and between them and the control device. The safety device is in a position to monitor the functioning of the control device and the modules on the basis of the exchanged data.

On the basis of the exchanged data the safety device can prepare a log of the processing operations of the individual modules at the same time as the control device. By comparing the logs of control device and safety device one can detect deviations in the count of bank notes and thus increase the counting reliability.

Additionally the safety device can detect whether data exchanged between the control device and the modules or among the modules themselves are ones not intended in correct operation and thus indicating manipulation of the apparatus with intent to defraud.

For increasing the safety further, the safety device can be protected by suitable measures against manipulation from outside. On one hand the safety device can be designed so that the other components cannot access the safety device. This prevents alteration of the safety device data through these components. On the other hand the safety device can be housed e.g. in a closed room to which only authorized personnel have access so that it is protected physically from outside access.

The connection for data exchange among the modules themselves and between them and the control device is preferably realized by a data bus. The latter can be expanded into a network if required.

BRIEF DESCRIPTION OF THE DRAWINGS

Further features of the invention can be found in the subclaims. In the following an embodiment of the invention will be described with reference to the FIGURES, in which:

DESCRIPTION OF THE PREFERRED EMBODIMENT

Figure 1:
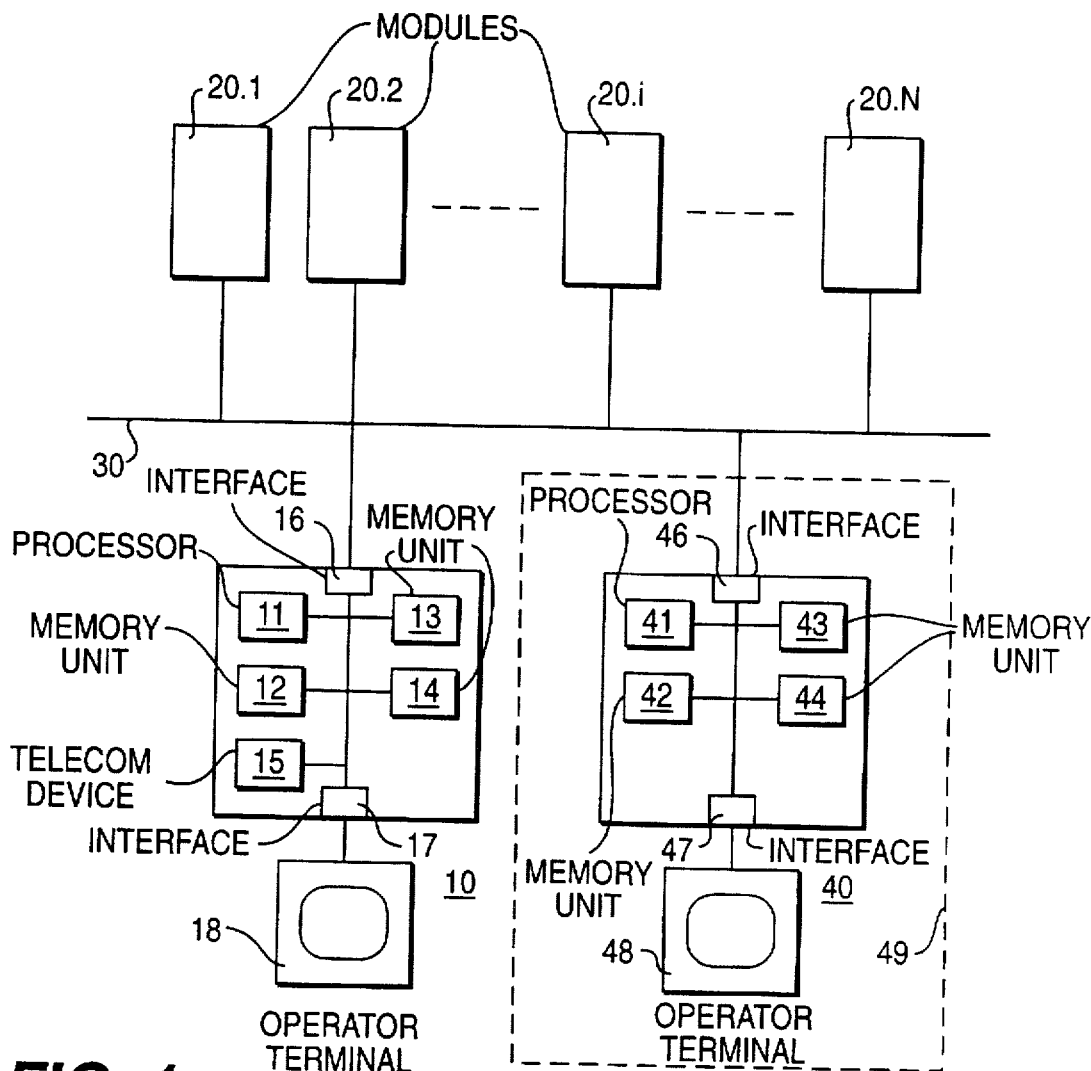
FIG. 1 shows a block diagram of the processing apparatus.

FIG. 1 shows a block diagram of an inventive processing apparatus consisting of control device 10, a plurality of modules 20.1 to 20.N, connection 30 and safety device 40.

Control device 10 can be realized for example by a commercial personal computer (PC). It includes processor 11 and memory unit 12 consisting of at least one RAM, ROM, EPROM, EEPROM or similar memories. The volatile RAM is generally used by processor 11 during execution of a program. The non-volatile memories contain data necessary for operating control device 10.

Memory unit 13 serves to store large amounts of data and can be realized for example by hard disk drives, floppy drives, CD-ROM drives or the like. Memory unit 13 stores data for control device 10 or modules 20.1 to 20.N. This data can then be transmitted to corresponding modules 20.i as required. Optionally one can also provide memory 14, similar to memory 13, on which all information is stored redundantly, so that if there is a disturbance in one of memories 13 and 14 the other memory can make the data available and thus prevent the information from being lost.

Furthermore optional data telecommunication device 15 can be provided in control device 10 to permit communication between control device 10 and external devices.

Interface 16 serves to connect control device 10 with connection 30. Operator terminal 18 belonging to control device 10 is connected via interface 17. The operator uses this terminal to enter the necessary data in control device 10.

Figure 2:
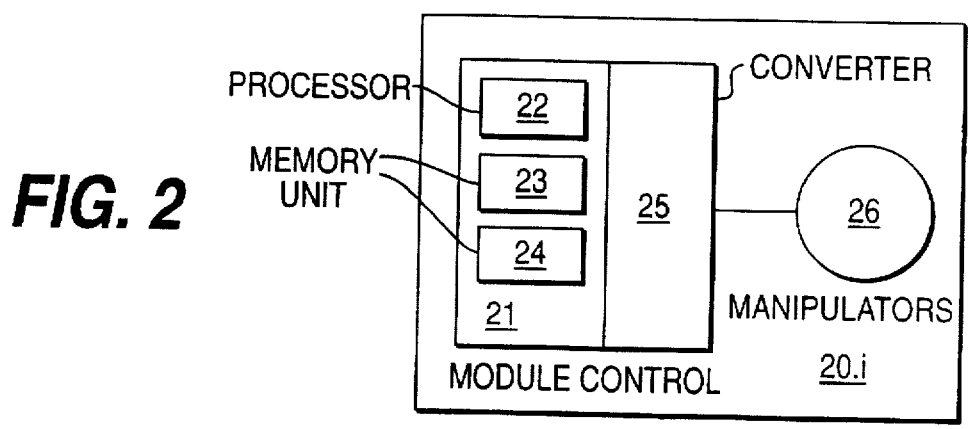
FIG. 2 shows a block diagram of a module.

Modules 20.1 to 20.N shown in FIG. 1 serve to carry out the processing operations in the apparatus. They each perform a different task in processing but can be described by a uniform block diagram. FIG. 2 shows the block diagram of such a module 20.i. It has its own module control 21 consisting of processor 22 and memory unit 23 which is analogous to memory unit 12 of control device 10. Optionally memory unit 24 can also be provided in module 20 for large amounts of data.

Module control 21 communicates via converter 25 with manipulators 26 shown only symbolically here. Converter 25 is generally an analog-to-digital converter for converting the signals between module control 21 and manipulators 26 from analog to digital signals or vice versa. The necessary processing operations on the bank notes are performed by manipulators 26. The term "manipulators 26" refers to both mechanical components, such as transport straps, drive rolls, switches, light barriers or the like, and sensors for optical, magnetic or electric properties of the bank notes.

FIG. 1 further shows connection 30 for data exchange among modules 20.1 to 20.N themselves and between them and control device 10. Connection 30 can be realized for example by a data bus. If required the data bus can be expanded into a network.

Safety device 40 is connected to connection 30 and consists substantially of the same components as control device 10. It too can be realized for example by a commercial PC. Safety device 40 includes processor 41, memory area 42 analogous to memory unit 12 of control device 10, and memory 43 for large amounts of data. Here too memory 44 can optionally be provided so that the data can be filed simultaneously in memory unit 43 and memory unit 44.

The connection of safety device 40 with connection 30 is established by interface 46. By means of interface 46 safety device 40 can read the data exchanged on connection 30 and also transmit data via connection 30 if required. Interface 46 is designed so that the data stored in safety device 40 cannot be changed via connection 30. This excludes manipulation of safety device 40 via connection 30. Any necessary changes in data of safety device 40 are made by the operator using operator terminal 48 connected via interface 47.

Safety device 40 can be housed in safety zone 49. This provides the protection of safety device 40 against physical access from outside and can be realized for example by a separate room to which only authorized personnel have access.

To increase the safety further, safety device 40 can also be decoupled electrically from connection 30. Furthermore a current supply independent from control device 10 can be provided for safety device 40.

Safety device 40 firstly monitors the accuracy of the data exchanged via connection 30. It can recognize data which indicate manipulation of the apparatus with intent to defraud.

Furthermore safety device 40 can prepare, at the same time as control device 10, a log from the data exchanged via connection 30. Comparison of the logs on control device 10 and safety device 40 permits disturbances in data processing to be detected.

To prepare a log on safety computer 40 it is necessary that the components transmit all log-relevant data through connection 30. This data includes specifically the data entered by the operator in control device 10 directly by means of operator terminal 18 or via telecommunication device 15.

Parallel logging makes it possible to have new programs for control device 10 checked for any errors by safety device 40 before these programs are released for operating the processing apparatus. This essentially facilitates the maintenance of the processing apparatus.

Telecommunication device 15 of control device 10 provides the possibility of accessing control device 10 by external devices as well. This is of advantage for example if higher-order statistics are to be prepared for a plurality of processing apparatus. For this purpose the necessary data can then be obtained from the processing machines directly by a central device.

Furthermore it is possible to transmit new data to control device 10 from an external device via telecommunication device 15. Specifically, suitable programs can be loaded into individual modules 20.i from the external devices via control device 10 and then executed for diagnostic purposes. The results of these programs can then be evaluated in the external device. This facilitates the maintenance of the processing apparatus further.

Monitoring by safety device 40 guarantees that no manipulation with intent to defraud can be performed through the external devices. External access to control device 10 via telecommunication device 15 is thus not an increased security risk in this case. Safety device 40 itself cannot be manipulated by external devices due to the above-described measures.

To increase the safety of the processing apparatus further, the data exchanged via connection 30 can be protected with any desired cryptographic algorithms. Due to the high data transmission rates in the processing apparatus the choice of the most suitable cryptographic algorithm depends solely an the time available for protection. One will thus choose the algorithm which quarantines the highest possible safety within the time available for protection:

We claim:

1. An apparatus for processing thin sheet material, comprising:

modules for processing bank notes, a control device for controlling the bank note processing operations, at least one connect for data exchange among the modules themselves and between said modules and said control device, and at least one safety device connected to said data exchange connect among said modules themselves and between said modules and said control device said at least one safety device having means for monitoring the functioning of said control device and said modules with reference to said data exchanged via said connections, wherein each of said control device and said at least one safety device includes means for generating a log from said data exchanged via said connection.

2. The apparatus of claim 1, wherein the safety device cannot be accessed via the data exchange connect.

3. The apparatus of claim 1, wherein the safety device is protected physically against access from outside.

4. The apparatus of claim 1, wherein the safety device is decoupled electrically from the data exchange connect.

5. The apparatus of claim 1, wherein the safety device has a current supply independent from the current supply of the control device.

6. The apparatus of claim 1, wherein means are provided in the control device for permitting communication between said control device and external devices.

7. The apparatus of claim 1, wherein the modules each contain module control means.

8. The apparatus of claim 1 wherein the data exchange connect is executed as a data bus.

9. The apparatus of claim 1, wherein the data exchange connect is executed as a network.

10. The apparatus of claim 1, wherein redundant memory means are provided in the control device.

11. The apparatus of claim 1, wherein redundant memory means are provided in the safety device.

12. A method for processing thin sheet material, said method comprising the steps of:

exchanging data necessary for processing said bank notes among a plurality of modules for processing bank notes and between said modules and a control device via a data exchange connect, transmitting from all components log-relevant data via the data exchange connect: and monitoring said log relevant data via a safety device operatively connected to said modules and said control device via said data exchange connect, wherein said step of monitoring includes generating in each said control device and said safety device a log of processing operations performed by said modules, and comparing said logs from said control device and said safety device with each other.

13. The method of claim 12 further comprising the step of:

operating the control device so as to communicate with external devices.

14. The method of claim 12 wherein at least one of the said steps of exchanging the data and transmiting log, relevant data includes transmitting data via the data exchange connect in an encoded form.

15. The method of claim 12, further comprising the step of:

storing at least one of bank note processing data and log relevant data redundantly in said control device and said safety device.

* * * * *